(12) United States Patent
Johnson et al.

(10) Patent No.: US 11,570,016 B2
(45) Date of Patent: Jan. 31, 2023

(54) ASSISTIVE CONTROL OF NETWORK-CONNECTED DEVICES

(71) Applicant: AT&T Intellectual Property I, L.P., Atlanta, GA (US)

(72) Inventors: Forest Johnson, Hazlet, NJ (US); Pamela Juhl Sokoler, Colts Neck, NJ (US); Prakash Thiruvenkatam, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 138 days.

(21) Appl. No.: 16/221,081

(22) Filed: Dec. 14, 2018

(65) Prior Publication Data

US 2020/0195463 A1 Jun. 18, 2020

(51) Int. Cl.
| | |
|---|---|
| G06F 15/173 | (2006.01) |
| H04L 12/28 | (2006.01) |
| H04L 41/0813 | (2022.01) |
| G06F 3/01 | (2006.01) |
| G06V 40/16 | (2022.01) |

(52) U.S. Cl.
CPC .......... *H04L 12/2816* (2013.01); *G06F 3/017* (2013.01); *G06V 40/176* (2022.01); *H04L 41/0813* (2013.01)

(58) Field of Classification Search
CPC ............. H04L 12/2816; H04L 41/0813; G06F 3/017; G06K 9/00315
USPC ....................................................... 709/223
See application file for complete search history.

(56) References Cited

U.S. PATENT DOCUMENTS

| | | | |
|---|---|---|---|
| 6,868,383 B1 | 3/2005 | Bangalore et al. | |
| 7,308,112 B2 | 12/2007 | Fujimura et al. | |
| 7,886,326 B2 | 2/2011 | Xiao | |
| 8,732,623 B2 | 5/2014 | Liang et al. | |
| 9,430,044 B2 | 8/2016 | Jain et al. | |
| 9,992,641 B2 | 6/2018 | Lee | |
| 10,061,390 B2 | 8/2018 | Libal et al. | |
| 10,146,319 B2 | 12/2018 | Tannenbaum et al. | |
| 2004/0193925 A1* | 9/2004 | Safriel | G06F 21/31 726/6 |
| 2005/0212760 A1* | 9/2005 | Marvit | G06F 1/1613 345/156 |
| 2008/0296372 A1* | 12/2008 | Joe | G06Q 10/10 235/384 |
| 2012/0154115 A1* | 6/2012 | Errala | G07C 9/28 340/5.64 |

(Continued)

FOREIGN PATENT DOCUMENTS

| | | | | |
|---|---|---|---|---|
| CN | 101344919 B | 8/2012 | | |
| CN | 104504365 A | * 4/2015 | ......... | G06K 9/00315 |

(Continued)

*Primary Examiner* — Hannah S Wang (57) ABSTRACT

Devices, computer-readable media, and methods for changing the state of a network-connected device in response to at least one facial gesture of a user are disclosed. For example, a processing system including at least one processor captures images of a face of a user, detects at least one facial gesture of the user from the images, determines an intention to change a state of a network-connected device from the at least one facial gesture, generates a command for the network-connected device in accordance with the intention, and outputs the command to cause the state of the network-connected device to change.

20 Claims, 3 Drawing Sheets

(56) References Cited

U.S. PATENT DOCUMENTS

| | | | |
|---|---|---|---|
| 2012/0327232 A1* | 12/2012 | Yang | B60N 2/0248 |
| | | | 348/148 |
| 2013/0204408 A1 | 8/2013 | Thiruvengada et al. | |
| 2014/0211593 A1* | 7/2014 | Tyler | A61B 5/0476 |
| | | | 367/137 |
| 2015/0185827 A1* | 7/2015 | Sayed | G06F 3/013 |
| | | | 345/156 |
| 2016/0182826 A1* | 6/2016 | Blum | H02J 50/80 |
| | | | 348/372 |
| 2016/0198304 A1* | 7/2016 | Oh | H04L 67/148 |
| | | | 455/41.3 |
| 2016/0260143 A1* | 9/2016 | Ekambaram | G06K 9/00302 |
| 2017/0262779 A1* | 9/2017 | Remaker | G06Q 10/06313 |
| 2017/0265272 A1* | 9/2017 | Shan | H05B 37/0218 |
| 2018/0018965 A1 | 1/2018 | Daley | |
| 2018/0048859 A1 | 2/2018 | Episkopos et al. | |
| 2018/0053504 A1* | 2/2018 | Wang | G10L 15/22 |
| 2018/0189514 A1* | 7/2018 | Yocam | G06F 21/6245 |
| 2018/0285062 A1* | 10/2018 | Ulaganathan | H04L 67/12 |
| 2018/0286392 A1 | 10/2018 | Min et al. | |
| 2018/0288104 A1* | 10/2018 | Padilla | H04L 65/1069 |
| 2019/0147905 A1* | 5/2019 | Mai | G06F 3/16 |
| | | | 704/275 |
| 2019/0164556 A1* | 5/2019 | Weber | G06F 3/167 |
| 2019/0179605 A1* | 6/2019 | Stefan | H04R 3/12 |
| 2019/0228773 A1* | 7/2019 | Gao | G06F 1/3231 |
| 2019/0285881 A1* | 9/2019 | Ilic | G02B 27/017 |
| 2020/0005557 A1* | 1/2020 | Madaan | G06Q 20/14 |
| 2020/0016745 A1* | 1/2020 | Tang | G05B 13/042 |
| 2020/0092701 A1* | 3/2020 | Arnberg | H04W 8/005 |

FOREIGN PATENT DOCUMENTS

| | | |
|---|---|---|
| CN | 102727350 B | 5/2015 |
| CN | 105105938 A | 12/2015 |
| JP | 2004301869 A | 10/2004 |

* cited by examiner

ASSISTIVE CONTROL OF NETWORK-CONNECTED DEVICES

The present disclosure relates to network-connected devices (e.g., Internet of Things (IoT) devices), and more particularly to devices, non-transitory computer-readable media, and methods for changing the state of a network-connected device in response to at least one facial gesture of a user.

BACKGROUND

Individuals with certain health restrictions and physical disabilities may have difficulties performing normal home-based operations such as: turning on lights, turning on or changing television settings, adjusting a thermostat, unlocking doors, making phone calls, and so forth.

SUMMARY

Devices, computer-readable media, and methods for changing the state of a network-connected device in response to at least one facial gesture of a user are disclosed. For example, a processing system including at least one processor may capture images of a face of a user, detect at least one facial gesture of the user from the images, determine an intention to change a state of a network-connected device from the at least one facial gesture, generate a command for the network-connected device in accordance with the intention, and output the command to cause the state of the network-connected device to change.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Devices, computer-readable media, and methods for changing the state of a network-connected device in response to at least one facial gesture of a user are disclosed. For instance, individuals with certain health restrictions and physical disabilities may have difficulties performing normal home-based operations such as: turning on lights, turning on or changing television settings, adjusting a thermostat, unlocking doors, making phone calls, and so forth. Examples of the present disclosure track a user's facial expressions which are mapped to particular skills of digital assistants and/or the native control capabilities of Internet of Things (IoT) devices. This allows the user to control various aspects of an environment which may be difficult or impossible to otherwise address. The present disclosure may include one or more portable devices, or may utilize public and/or shared computing infrastructure to follow the user through an environment. For instance, aspects of the present disclosure may be embodied as computing device(s) attached to a wheelchair, but may also involve cameras, microphones, and the like deployed in a home or care facility, for example.

In one example, the present disclosure takes video of the user's face and maps facial gesture(s) into a speech command for a digital voice assistant that is configured to control various network-connected devices. In one example, the present disclosure may be invoked by the user pushing a hard button or soft button (e.g., on a wheelchair, via a personal computing device, etc.), or by presenting a facial gesture that activates the system. When active, the present disclosure may capture images and/or video of the user's face. Visual information may then be extracted and processed via machine learning computer vision algorithm(s) to understand what facial gesture(s) is/are being made. For instance, the present disclosure may capture facial landmarks (spatial landmarks), and compute the expressions corresponding to those patterns of facial landmarks (e.g., both intra-frame and inter-frame (including smiles, frowns, eye blinks, head shaking, raising eyebrows, etc.). Gestures that are determined may then be fed into a mapping process. For instance, two blinks and a nod may signify a command to turn a light on. In one example, non-speech utterances from audio data may also be used to accelerate command recognition. For example, two blinks and a grunt may be established to mean "close the window." This may be easier to detect and slightly faster than detecting two blinks and a smile. In this regard, it should also be noted that examples of the present disclosure, using short sequences of facial gestures and/or non-speech utterances, may also provide faster control over network-connected devices than other systems such as those which may track a user's eye gaze for typing out sentences.

In one example, the mapping process takes the intended action and converts to a speech command. In one example, the present disclosure may state out loud (via machine-generated speech) the inferred action, and ask the user to confirm if this is the action that the user intended. In one example, the confirmation may trigger additional video capture, or the video may continue to be captured, and from the video stream, the user's new facial gesture(s) may be determined to see if the facial gesture(s) indicate the user's agreement/confirmation. To illustrate, a smile may indicate that the command is as the user intended, while a frown may indicate that this is not the command that the user intended. In one example, a "no" may trigger new and/or continued video capture to obtain images/video of the user's face, extract spatial/facial landmarks, determining facial gesture(s), map the facial gesture(s) to one or more commands, verify the one or more commands are correctly inferred, and so on. If the user confirms the inferred command is what the user intended, the present disclosure may generate speech output that may be picked up by a digital voice assistant which may then interact with IoT devices (e.g., in the user's house).

In one example, actions may be pre-set and configured to the capabilities of the user. In other words, mapping may be user-specific. Actions may involve opening and closing doors and windows, activating and deactivating a heating or cooling system, raising or lowering a temperature via a thermostat, placing phone calls, answering phone calls, etc. In one example, the present disclosure may employ machine learning to also learn the user's intent so that the user can make up sequences of gestures to signify commands. In one example, the present disclosure may be deployed as intelligence in a camera. In another example, a camera may communicate with a smartphone, a laptop computer, or other personal computing device with processing capabilities in accordance with the present disclosure. In another example, the present disclosure may include a wearable device with a camera facing the user, e.g., a hat with brim containing a camera directed at user's face. In one example, the present disclosure may utilize a portable user profile and track the user at different buildings or other locations. The user's profile and his/her unique set of commands may be utilized in the different environments even where the user does not own or have ultimate responsibility for the network-connected devices, such as in a hospital, an assisted living facility, or similar setting.

In one example, the present disclosure may include a network-based processing system, so long as an image/video feed can be routed to the processing system, and the processing system can provide control back to the local environment. In one example, the user and an infrastructure owner may both subscribe to a network-based service of a telecommunication network in accordance with the present disclosure. In addition, in one example, a user may be registered via facial recognition, e.g., by sending an image from a camera in an environment to a telecommunication network-based processing system which may identify the user and determine which user profile should become active. In such an example, controllable IoT devices in the local environment may also be determined by the local environment providing identification information along with the facial image(s) for recognition. These and other aspects of the present disclosure are discussed in greater detail below in connection with the examples of FIGS. 1-3.

Figure 1:
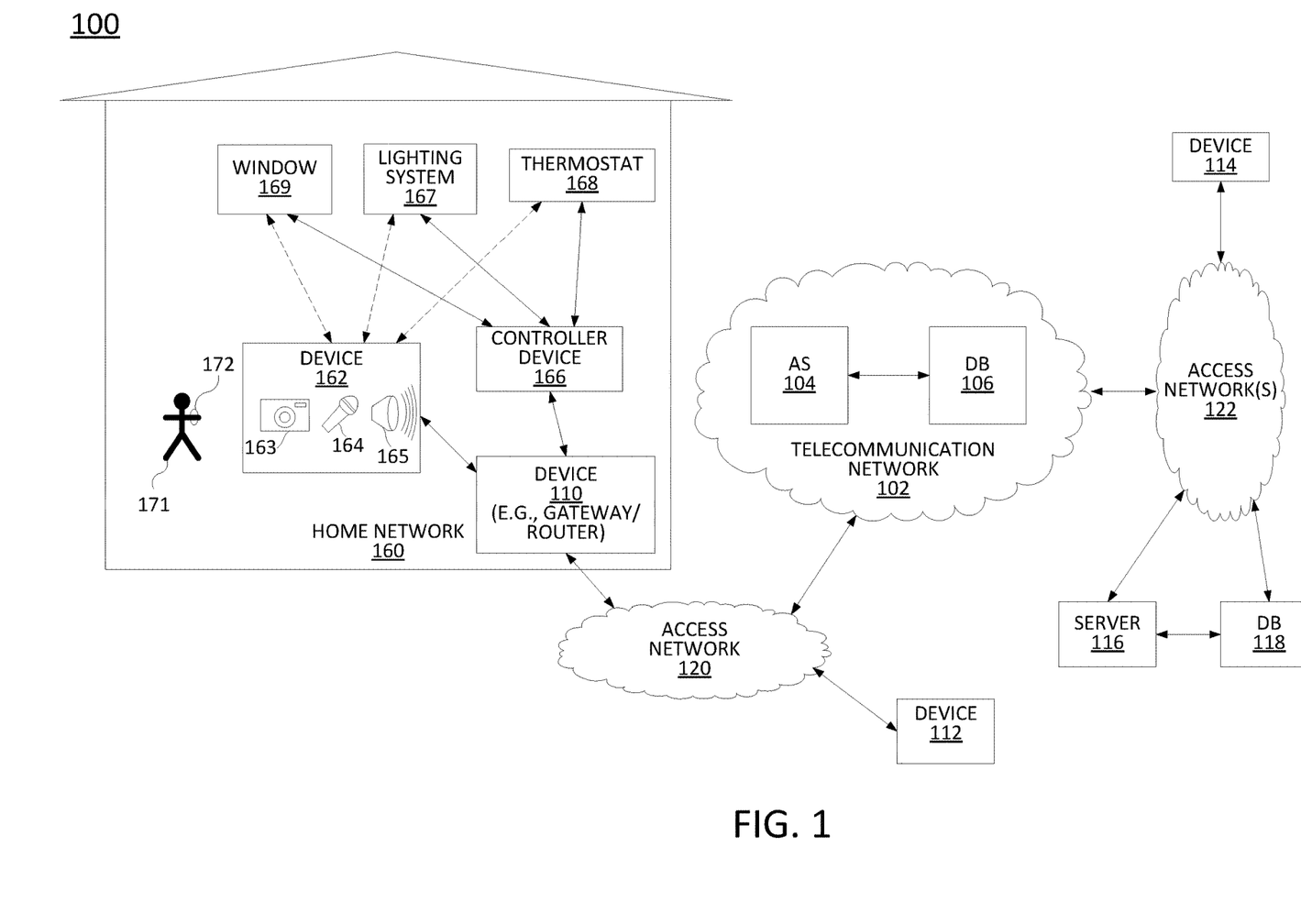
FIG. 1 illustrates an example network or system related to the present disclosure.

To further aid in understanding the present disclosure, FIG. 1 illustrates an example system 100 in which examples of the present disclosure for changing the state of a network-connected device in response to at least one facial gesture of a user may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a telecommunication network 102. The telecommunication network 102 may be in communication with one or more access networks 120 and 122, and the Internet (not shown). In one example, telecommunication network 102 may combine core network components of a cellular network with components of a triple play service network; where triple-play services include telephone services, Internet services and television services to subscribers. For example, telecommunication network 102 may functionally comprise a fixed mobile convergence (FMC) network, e.g., an IP Multimedia Subsystem (IMS) network. In addition, telecommunication network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 102 may further comprise a broadcast television network, e.g., a traditional cable provider network or an Internet Protocol Television (IPTV) network, as well as an Internet Service Provider (ISP) network. In one example, telecommunication network 102 may include a plurality of television (TV) servers (e.g., a broadcast server, a cable head-end), a plurality of content servers, an advertising server (AS), an interactive TV/video on demand (VoD) server, and so forth. For ease of illustration, various additional elements of telecommunication network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute for Electrical and Electronics Engineers (IEEE) 802.11/Wi-Fi network and the like), cellular access networks, 3rd party networks, and the like. For example, the operator of telecommunication network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one embodiment, the telecommunication network 102 may be operated by a telecommunication network service provider. The telecommunication network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110 and 112. Similarly, access networks 122 may be in communication with one or more devices, e.g., device 114. Access networks 120 and 122 may transmit and receive communications between devices 110, 112, and 114, between devices 110, 112, and 114, and server 116 and/or database (DB) 118, application server (AS) 104 and/or database (DB) 106, other components of telecommunication network 102, devices reachable via the Internet in general, and so forth. In one example, each of the devices 110, 112, and 114 may comprise any single device or combination of devices that may comprise a user endpoint device and/or customer premises equipment (CPE). For example, the devices 110, 112, and 114 may each comprise a mobile device, a cellular smart phone, a laptop, a tablet computer, a desktop computer, an application server, a bank or cluster of such devices, and the like. Alternatively, or in addition, devices 110, 112, and 114 may each comprise a home gateway, a router, or any combination thereof, and so forth.

To illustrate, device 110 may comprise a gateway/router deployed in a customer premises (home network 160). In one example, device 110 may receive data/communications associated with different types of media, e.g., television, phone, and Internet, via access network 120, telecommunication network 102, etc., and separate these communications for the appropriate devices. In one example, television information may be forwarded to a set-top box (STB)/digital video recorder (DVR) and/or a television (TV) for presentation (not shown). Similarly, telephone communications may be sent to and received from home phone (not shown).

Data communications (e.g., Internet communications) may be sent to and received from device 162 and/or controller device 166. For instance, device 162 may comprise a laptop, a tablet computer, a desktop computer, etc. In the present example, device 162 may include a camera 163, a microphone 164, and a speaker 165. In addition, device 162 may comprise a computing system, such as computing system 300 depicted in FIG. 3, and may be configured to provide one or more functions for changing the state of a network-connected device in response to at least one facial gesture of a user, in accordance with the present disclosure. For example, device 162 may be configured to perform one or more steps, functions, or operations in connection with the example method 200 described below.

Figure 3:
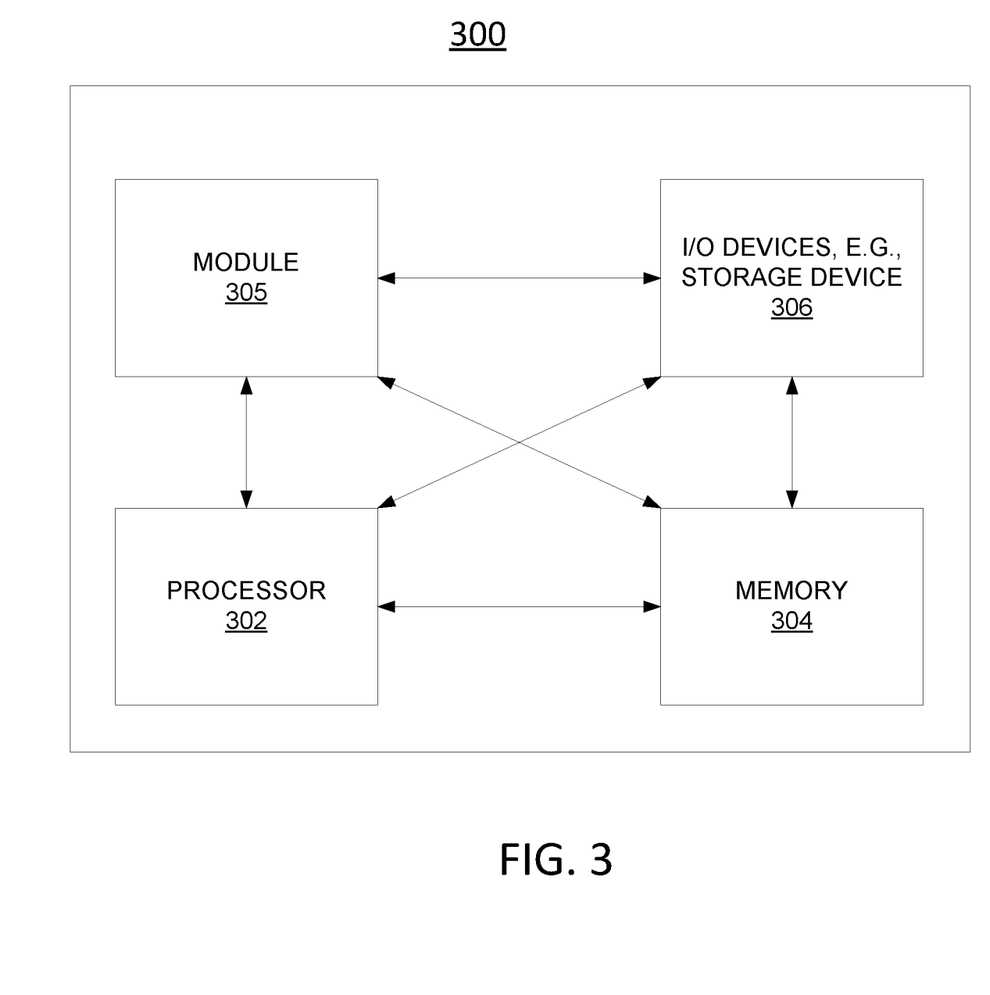
FIG. 3 illustrates a high-level block diagram of a computing device specially programmed to perform the functions described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

To illustrate, device 162 may capture images of a face of user 171 (e.g., via camera 163), detect at least one facial gesture of the user 171 from the images, determine an intention to change a state of a network-connected device from the at least one facial gesture, generate a command for the network-connected device in accordance with the intention, output the command to cause the state of the network-connected device to change (e.g., an audio/verbal command for controller device 166 that is output via speaker 165), and so forth. In one example, user 171 may comprise a user in need of assistance for various tasks and/or for whom various daily tasks may be difficult, and who may also be unable to speak verbal commands that may be understood by controller device 166. For instance, user 171 may have had surgery or may have a type of palsy which makes speech impossible, painful, or difficult. However, the user 171 may still be able to control facial gestures such as blinking, winking, nodding, head shaking, smiling, frowning, etc. In one example, device 162 may initially detect a presence of user 171 before activating additional operations for changing the state of a network-connected device in response to at least one facial gesture of a user, as described herein. For instance, user 171 may be wearing a radio frequency identification (RFID) tag 172 which may transmit a code identifying user 171 to device 162 upon interrogation of the RFID tag 172. Alternatively, or in addition, user 171 may be detected via a short range wireless communication between a mobile device of user 171 (not shown) and device 162 (e.g., IEEE 802.11 based communications (e.g., "Wi-Fi"), IEEE 802.15 based communications (e.g., "Bluetooth", "ZigBee", etc.), and so forth).

In one example, an output audio/verbal command for controller device 166 that is output via speaker 165 may indicate the intention to change the state of lighting system 167 (e.g., turn light(s) on or off, dim or brighten light(s), etc.), thermostat 168 (e.g., raise or lower temperature, turn on or off, etc.), or window 169 (e.g., open or close, open or close shades, etc.). In one example, device 162 may also capture non-speech utterances of the user 171 (e.g., via microphone 164) which in combination with at least one facial gesture, may also comprise a sequence indicative of an intention to change a state of a network-connected device. For example, the user 171 may still be able to control non-speech utterances which may be used to indicate various intentions regarding network-connected devices. It should be noted that the network-connected devices specifically shown in FIG. 1 are provided for illustrative purposes. Thus, it should be understood that various other types of network-connected devices/IoT devices may be controlled in a similar manner as described herein, such as network-connected security devices or systems, e.g., network-connected doors, locks, cameras, alarms, etc., network-connected appliances, e.g., network-connected coffee machines, refrigerators, faucets, toilets, or other plumbing, network-connected entertainment units, such as set-top boxes and/or televisions, and so on.

In one example, device 162 may register and/or store a gesture-to-intention mapping of the user 171. For instance, device 162 may be configured to prompt user 171, an assistant, and/or a caregiver to enter sequences of one or more gestures and to indicate a corresponding intention to change a state of a network-connected device that should be attributed to the sequence. In one example, a sequence may be provided to device 162 by user 171 performing the gesture(s) to be captured via camera 162. In another example, a caregiver may indicate a sequence of one or more gestures which may be selected from a menu on an interactive screen and arranged in a particular order. In still another example, device 162 may learn gesture-to-intention mappings via machine learning, e.g., by attempting to infer the intention of user 171, prompting the user 171 to confirm or deny the inference, and learning over time which state change(s) of network-connected device(s) are intended by the user 171 for various sequences of gestures.

In one example, facial gestures of user 171 may be determined via one or more machine learning (ML) models, e.g., facial gesture detection models. As referred to herein, a machine learning model (MLM) (or machine learning-based model) may comprise a machine learning algorithm (MLA) that has been "trained" or configured in accordance with input data (e.g., training data) to perform a particular service, e.g., to detect a type of object, such as a face, in images and/or video content, to detect speech or other utterances in audio content, and so forth. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth. In one example, facial gesture detection may be in accordance with a MLA/MLM from an open source library, such as OpenCV, which may be further enhanced with domain specific training data, such as image and/or video of various facial gestures of various users and/or the user 171 in particular.

To illustrate, a first facial gesture detection model (e.g., a binary classifier) may be trained to detect a smile, a second facial gesture detection model may be trained to detect a frown, a third facial gesture detection model may be trained to detect a head shake, and so forth. Alternatively, or in addition, a multi-class classifier may be trained to detect and distinguish between a plurality of different facial gestures. The types of features from which facial gesture detection/recognition models may be derived may include visual features from images or video. For instance, the visual features may include low-level invariant image data, such as colors (e.g., RGB (red-green-blue) or CYM (cyan-yellow-magenta) raw data (luminance values) from a CCD/photosensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like.

In one example, facial gesture detection models may each comprise an eigenface representing facial features indicative of a particular facial gesture. In one example, eigenfaces representing particular facial gestures may be trained from an image or video library comprising a cross-section of sample faces in various gestures/expressions. Alternatively, or in addition, each eigenface may be personalized to the user 171. For instance, one or more images or video of the user 171 engaging in different facial gestures may be used as input data to train a respective model for each of the facial gestures that may comprise a part of a sequence as described above. In one example, each facial gesture detection model may comprise a feature vector representative of a particular facial gesture.

In any event, device 162 may apply new input data, e.g., a video or image feed from camera 162 to the one or more facial gesture detection models. For instance, device 162 may detect that user 171 is smiling by extracting visual features form the video or image feed, comparing the features to the model (e.g., an eigenface) for "smile," and determine that the user is smiling when the distance between the extracted visual features and the eigenface is less than a threshold (e.g., a Euclidean distance in a feature space having dimensions corresponding to the subject visual features). It should be noted that although the foregoing describe an example with an eigenface algorithm, the present disclosure is not limited to the use of this technique. For example, the set of quantized vectors (visual features) may be encoded using techniques such as principal component analysis (PCA), partial least squares (PLS), sparse coding, vector quantization (VQ), deep neural network encoding, and so forth. Similarly, the facial gesture detection may be based upon a model that accounts for motion in the video and/or between images/frames captured via camera 163.

Similarly, non-speech utterances may be detected in accordance with one or more ML-based models, e.g., non-speech utterance detection model(s). For instance, a model for detecting a grunt may be trained from an audio library of grunts and/or from one or more audio samples of user 171 making such a sound (e.g., captured via microphone 164). The model may be trained from extracted audio features, such as low-level audio features, including: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth. Additional models may also be trained for detecting whistles, moans, clicks, and so forth. In one example, each audio model may comprise a feature vector representative of a particular sound.

In any event, device 162 may apply new input data, e.g., an audio feed from microphone 164 to the one or more non-speech utterance detection models. For instance, device 162 may detect that user 171 is making a clicking sound by extracting audio features from the audio feed, comparing the features to the model for "click," and determining that the user is making the clicking sound when the distance between the extracted audio features and the model is less than a threshold (e.g., a Euclidean distance in a feature space having dimensions corresponding to the subject audio features). As described above, these types of non-speech utterances may be included in sequences along with facial gestures that may be used to indicate a user's intentions to change the states of various network-connected devices.

In one example, the controller device 166 may comprise a computing system, such as computing system 300 depicted in FIG. 3, and may be configured to provide one or more functions for changing the state of a network-connected device in response to at least one facial gesture of a user, in accordance with the present disclosure. For example, controller device 166 may be configured to perform one or more steps, functions, or operations in connection with the example method 200 described below. As illustrated in FIG. 1, controller device 166 may be in communication with various network-connected devices (e.g., IoT devices/appliances) within home network 160. In this regard, controller device 166 may also include a transceiver for IEEE 802.11-based communications, for IEEE 802.15-based communications, for wired communications, e.g., for wired Ethernet, and so forth. For instance, lighting system 167, thermostat 168, and window 169 may comprise "smart" appliances, with wired and/or wireless networking/communication capability. In other words, these components may comprise network-connected, remote-controllable devices (e.g., Internet of Things (IoT) devices). Thus, such appliances may be remotely programmed or configured, and may communicate operational data to remote devices (e.g., in home network 160 or elsewhere) via one or more networks or network links. For instance, each of these devices may include a transceiver for IEEE 802.11-based communications, for IEEE 802.15-based communications, for wired communications, e.g., for wired Ethernet, and so forth.

In one example, the controller device 166 may comprise an interactive voice assistant device that is configured to receive verbal commands and to execute various tasks in accordance with the verbal commands. This includes controlling the states of network-connected, remote-controllable devices, such as lighting system 167, thermostat 168, window 169, and so forth. Thus, in accordance with the present disclosure, device 162 may cause the states of various network-connected devices to change by issuing machine-generated verbal commands to controller device 166 in accordance with the intentions of user 171 as determined from facial gestures and/or non-speech utterances.

Alternatively, or in addition, device 162 may communicate directly with one or more of the network-connected devices (e.g., lighting system 167, thermostat 168, window 169, etc.) to effect a change in state(s).

In one example, the audio/verbal command for controller device 166 may be output by device 162 via speaker 165 in a format in accordance with a configuration of controller device 166. For instance, controller device 166 may include a specific "wake-up" word, phrase, or other command, after which a more detailed command may be anticipated. In one example, controller device 166 may be configured with a list of verbal commands which may be provided to controller device 166 to cause controller device 166 to perform various actions. In one example, controller device 166 may also be configured to receive and interpret natural language commands, to engage in natural language interactions (e.g., to request clarification of a command or to indicate that the controller device 166 did not understand input sounds to be a particular command, and so forth). In one example, device 162 may be similarly configured to regenerate an audio/verbal output upon receiving a request for clarification from controller device 166. For instance, device 162 may detect such a request via microphone 164.

In one example, the access networks 122 may also be in communication with a server 116 and a database (DB) 118. The server 116 and DB 118 may comprise or be associated with, for example, a network-connected device management platform (e.g., an IoT device management platform). In accordance with the present disclosure, server 116 may comprise a computing system or server, such as computing system 300 depicted in FIG. 3, and may be configured to provide one or more operations or functions for changing the state of a network-connected device in response to at least one facial gesture of a user, as described herein. In one example, DB 118 may comprise a physical storage device integrated with server 116 (e.g., a database server), or attached or coupled to the server 116, to store various types of information in support of systems for changing the state of a network-connected device in response to at least one facial gesture of a user, in accordance with the present disclosure. For example, DB 118 may store gesture-to-intention mappings for one or more users, audio files with audio/verbal commands, ML-based facial gesture detection model(s) (e.g., user-specific and/or non-user specific), ML-based non-speech utterance detection model(s) (e.g., user-specific and/or non-user specific), information to detect a presence of a user (e.g., RFID tag information, user-specific facial recognition information, etc.), and so forth that may be processed by server 116. DB 118 may also store programs, logic, or instructions that may be executed by server 116 for changing the state of a network-connected device in response to at least one facial gesture of a user, as described herein.

To illustrate, device 162 may capture video and/or audio of user 171 via camera 163 and/or microphone 164 and may transmit a video (e.g., a sequence of images) and/or audio stream to server 116. In turn, server 116 may perform various operations as described above such as detecting at least one facial gesture of the user 171 from the video/images and determining an intention to change a state of a network-connected device from the at least one facial gesture. In one example, server 116 may generate a command for the network-connected device in accordance with the intention and may transmit the command to device 162 and/or controller device 166. For instance, in one example, the server 116 may provide an audio file with audio/verbal commands to device 162 to be played out via speaker 165 and captured by controller device 166 to cause controller device 166 to make the corresponding state change of the network-connected device(s). In another example, the server 116 may transmit a command to the controller device 166, e.g., bypassing device 162, and which may be received by controller device 166 in accordance with an application programming interface (API). These and other aspects of the present disclosure are discussed in greater detail below in connection with the examples of FIGS. 2 and 3.

Although only a single server 116 and a single DB 118 are illustrated, it should be noted that any number of servers 116 or databases 118 may be deployed. In one example, telecommunication network 102 may also include an application server (AS) 104 and a database (DB) 106. In one example, AS 104 may perform the same or similar functions as server 116. Similarly, DB 106 may store the same or similar information as DB 118 (e.g., gesture-to-intention mappings for one or more users, audio files with audio/verbal commands, ML-based facial gesture detection model(s), ML-based non-speech utterance detection model(s), information to detect a presence of a user (e.g., RFID tag information), etc., programs, logic, or instructions that may be executed by AS 104 and/or server 116 for changing the state of a network-connected device in response to at least one facial gesture of a user, and so forth). For instance, telecommunication network 102 may provide a network-connected device management service (e.g., an IoT device management service) to subscribers, e.g., in addition to television, phone, and/or other telecommunication services. In one example, AS 104, DB 106, server 116, and/or DB 118 may operate in a distributed and/or coordinated manner to perform various steps, functions, and/or operations described herein.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of telecommunication network 102 and/or access networks 120 and 122 may comprise a content distribution network (CDN) having ingest servers, edge servers, and the like, for packet-based streaming of videos or video segments that may be provided in accordance with the present disclosure. Similarly, although only two access networks 120 and 122 are shown, in other examples, access networks 120 and/or 122 may each comprise a plurality of different access networks that may interface with telecommunication network 102 independently or in a chained manner. For example, device 114 and server 116 may access telecommunication network 102 via different access networks, devices 110 and 112 may access telecommunication network 102 via different access networks, and so forth. Thus, these and other modifications are all contemplated within the scope of the present disclosure.

Figure 2:
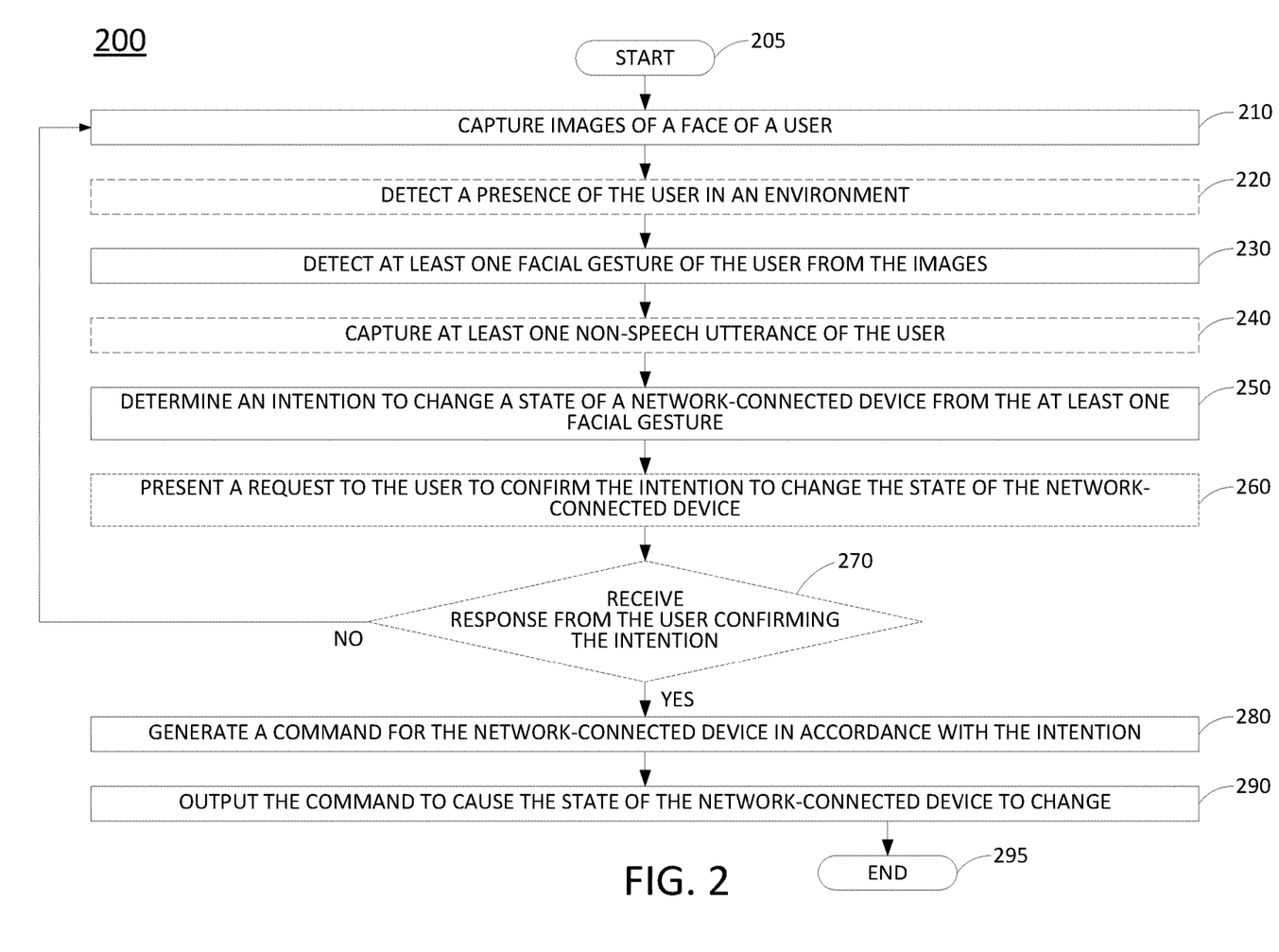
FIG. 2 illustrates a flowchart of an example method for changing the state of a network-connected device in response to at least one facial gesture of a user.

FIG. 2 illustrates a flowchart of an example method 200 for changing the state of a network-connected device in response to at least one facial gesture of a user. In one example, the method 200 is performed by a component of the system 100 of FIG. 1, such as by device 162, server 116, AS 104, and/or any one or more components thereof (e.g., a processor, or processors, performing operations stored in and loaded from a memory), or by device 162, server 116, or AS 104 in conjunction with one or more other devices, such as controller device 166, and so forth. In one example, the steps, functions, or operations of method 200 may be performed by a computing device or system 300, and/or processor 302 as described in connection with FIG. 3 below. For instance, the computing device or system 300 may represent any one or more components of device 162, one or more of server 116, AS 104, etc. in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system.

The method 200 begins at step 205 and proceeds to step 210.

In step 210, the processing system captures images of a face of a user. The images of the face of the user may be close-up/portrait type images or may be images of an environment that include the face of the user. In one example, the images of the face of the user are captured via a digital camera which may be part of the processing system or a separate device. The processing system may be deployed "local" to the user, e.g., at a customer premises, or may be remote (e.g., a cloud/network-based processing system, a telecommunication network-based processing system, etc.). Similarly, the processing system may be owned or controlled by the user, or may be operated by a different entity on behalf of the user and/or for multiple users.

In optional step 220, the processing system may detect a presence of the user in an environment. In one example, the presence of the user is detected via the images of the face of the user captured at step 210. For instance, a camera deployed in the environment may provide a video or image feed to the processing system which may perform a facial recognition to identify the face of the user. For example, features may be extracted from the video/image(s) to create a feature vector which may be compared to a feature vector representing the user (e.g., an eigenface). When the distance between the vectors is below a threshold, it may be determined that the video/image(s) includes the face of the user. In another example, the presence of the user may be detected via a detection of a wireless device of the user, such as the user's smartphone, a RFID tag, or the like.

In step 230, the processing system detects at least one facial gesture of the user from the images. In one example, the detecting the at least one facial gesture of the user from the images is in accordance with a machine learning model for the at least one facial gesture. In one example, the at least one facial gesture comprises a sequence of facial gestures. The at least one facial gesture may comprise, for example, at least one of: a blink, a wink, a head nod, a head shake, or a frown. In one example, the detecting the at least one facial gesture of the user is activated in response to detecting the presence of the user at optional step 220. In addition, in one example, the machine learning model may be user-specific, e.g., trained via a MLA in accordance with training data comprising the user engaging in one or more facial gestures. To illustrate, the processing system may extract visual features from the images of the face of the user and compare to a feature vector of the visual features of one or more MLMs for identifying facial gestures. The processing system may identify a facial gesture of the user when a distance between a feature vector from the captured images/video and one or more of the MLMs is below a threshold.

In optional step 240, the processing system may capture at least one non-speech utterance of the user. For instance, in addition to the video/images containing the face of the user, the processing system may also capture audio of the user from the environment. In one example, the processing system may extract audio features from an audio stream captured from a microphone and compare a feature vector of the audio features to one or more MLMs for identifying non-speech utterances. The processing system may identify one or more non-speech utterances of the user when a distance between a feature vector from the captured audio and one or more of the MLM is below a threshold. It should be noted that a variety of other types of detection algorithms may be applied in step 230 and optional step 240, such as decision tree-based models, and the like, which may not involve feature vectors, distance calculations, etc., but which may nevertheless be trained and used to detect different facial gestures and/or non-speech utterances as described herein.

In step 250, the processing system determines an intention to change a state of a network-connected device (e.g., a network-connected remote-controllable/IoT device) from the at least one facial gesture. In one example, the determining the intention to change a state of the network-connected device from the at least one facial gesture is based upon a gesture-to-intention mapping of the user. For instance, the processing system may maintain a plurality of gesture-to-intention mappings for the user and/or for a plurality of different users. In one example, the gesture-to-intention mapping is generated via a machine learning process. Alternatively, or in addition, the gesture-to-intention mapping for the user may be created by at least one of the user or a person assisting the user. In one example, the intention to change the state of the network-connected device is further determined from the at least one non-speech utterance of the user that may be captured at optional step 240. For instance, the processing system may learn or may be provided with a sequence of the at least one facial gesture and the at least one non-speech utterance, as well as an indication of a corresponding state change of a network-connected device to associate with the sequence. Thus, the intention may be determined from a sequence of the at least one facial gesture and the at least one non-speech utterance.

In optional step 260, the processing system may present a request to the user to confirm the intention to change the state of the network-connected device. For example, the processing system may present an audio and/or natural language request that the user confirm or deny the intention determined at step 250. For example, the processing system may present via a speaker of the processing system or a speaker otherwise deployed in the environment an audio output such as: "please smile to confirm, or frown to try again."

In optional step 270, the processing system may receiving a response from the user confirming the intention. For instance, the response may comprise at least one additional facial gesture. For instance, a smile may be designated as a confirmation gesture, whereas a frown may be designated as a gesture to indicate that the intention is incorrectly inferred. It should be noted that the user or another person may configure the processing system to utilize different sequence(s) of one or more facial gestures to confirm/deny the inferred intentions. However, in an illustrative example, single facial gestures are employed since the confirmation of steps 260 and 270 may involve just two choices. Similarly, in another example, non-speech utterances may be used for the confirmation request and response of optional steps 260-270. If the confirmation is positive at optional step 270, the method 200 may proceed to step 280. Otherwise the method 200 may return to step 210.

In step 280, the processing system generates a command for the network-connected device in accordance with the intention. In one example, the command is a machine-generated verbal command for a voice assistant device, wherein the voice assistant device is to control the network-connected device. In one example, the command is in a format that is in accordance with a configuration of the voice assistant device.

In step 290, the processing system outputs the command to cause the state of the network-connected device to change. For instance, processing system may play-out the command via a speaker in the vicinity of a controller devices, where the command is an audio/speech command for the controller device (e.g., a voice assistant device). In another example, the processing system may interface directly with the network-connected device via an audio interface, or via machine-to-machine communications via an API of the network-connected device, and so forth.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-290, and so forth. In another example, optional step 220 may be performed before step 210. For example, capturing images of the face of the user may be triggered by first detecting the presence of the user, e.g., via a mobile device, RFID tag, or the like. In still another example, the processing system may update gesture-to-intention mappings (and/or sequences of facial gestures and non-speech utterances) in accordance with the user response at optional step 270. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for changing the state of a network-connected device in response to at least one facial gesture of a user, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for changing the state of a network-connected device in response to at least one facial gesture of a user (e.g., a software program comprising computer-executable instructions) can be loaded into memory 304 and executed by hardware processor element 302 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for changing the state of a network-connected device in response to at least one facial gesture of a user (including associated data structures) of the present disclosure can be stored on a tangible or physical (broadly non-transitory) computer-readable storage device or medium, e.g., volatile memory, nonvolatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A system comprising:
a first processing system located in a home network including at least one processor, wherein the first processing system is remote from a telecommunication network that is connected to the home network via a cellular access network;
a first non-transitory computer-readable medium storing first instructions which, when executed by the first processing system, cause the first processing system to perform first operations, the first operations comprising:
capturing images of a face of a user;
sending the images of the face of the user to a second processing system;
capturing a first non-speech utterance of the user;
sending the first non-speech utterance of the user to the second processing system;
receiving an audio command from the second processing system; and
playing the audio command via a speaker of the first processing system in a vicinity of an interactive voice assistant device to change a state of a network-connected device by the interactive voice assistant device, wherein the first processing system, the second processing system, the interactive voice assistant device, and the network-connected device are distinct devices;
a second processing system in the telecommunication network including at least one processor; and
a second non-transitory computer-readable medium storing second instructions which, when executed by the second processing system, cause the second processing system to perform second operations, the second operations comprising:
obtaining, from the first processing system located in the home network via the cellular access network, the images of the face of the user;
detecting a first facial gesture of the user from the images;
obtaining, from the first processing system via the cellular access network, the first non-speech utterance of the user;
determining an intention to change the state of the network-connected device in the home network, and wherein the intention is determined from the first facial gesture and the first non-speech utterance based upon a mapping of the user, and wherein the mapping of the user is generated via a machine learning process that learns that the first facial gesture in combination with the first non-speech utterance signifies the intention to change the state of the network-connected device;
generating the audio command to cause the state of the network-connected device to change in accordance with the intention, after the first processing system confirms the intention to change the state of the network-connected device based on a response of the user that includes a second facial gesture and a second non-speech utterance; and
providing, via the cellular access network, the audio command to the first processing system along with an instruction to cause the first processing system to play the audio command via the speaker of the first processing system in the vicinity of the interactive voice assistant device located in the home network.

2. The system of claim 1, wherein the first processing system includes a camera.

3. The system of claim 1, wherein the detecting the first facial gesture of the user from the images is in accordance with the machine learning model for the first facial gesture.

4. The system of claim 1, wherein the second processing system maintains a plurality of user-specific mappings fora plurality of different users, and the mapping of the user is one of the plurality of user-specific mappings.

5. The system of claim 4, wherein each mapping of the plurality of user-specific mappings is created by at least one of:
a user with whom the each mapping is associated; or
a person assisting the user with whom the each mapping is associated.

6. The system of claim 1, wherein the first facial gesture is part of a sequence of facial gestures.

7. The system of claim 1, wherein the first facial gesture comprises at least one of:
a blink;
a wink;
a head nod;
a head shake; or
a frown.

8. The system of claim 1, wherein the intention is determined from a sequence of the first facial gesture and the first non-speech utterance.

9. The system of claim 1, wherein the second operations further comprise:
detecting a presence of the user in the home network, wherein the detecting the first facial gesture of the user is activated in response to the detecting the presence of the user.

10. The system of claim 9, where the presence of the user is detected via the images of the face of the user.

11. The system of claim 9, wherein the presence of the user is detected via:
a detection of a wireless device of the user.

12. A non-transitory computer-readable medium storing instructions which, when executed by a first processor located in a home network and a second processor located in a telecommunication network, wherein the second processor is remote from the home network that is connected to the telecommunication network via a cellular access network, cause the first processor to perform first operations and the second processor to perform second operations, the first operations comprising:
capturing images of a face of a user;
sending the images of the face of the user to the second processor;
capturing a first non-speech utterance of the user;

sending the first non-speech utterance of the user to the second processor;

receiving an audio command from the second processor; and playing the audio command via a speaker of the first processor in a vicinity of an interactive voice assistant device to change a state of a network-connected device by the interactive voice assistant device, wherein the first processor, the second processor, the interactive voice assistant device, and the network-connected device are distinct devices; and the second operations comprising:

obtaining, from the first processor located in the home network via the cellular access network, the images of the face of the user;

detecting a first facial gesture of the user from the images;

obtaining, from the first processor via the cellular access network, the first non-speech utterance of the user;

determining an intention to change the state of the network-connected device in the home network, and wherein the intention is determined from the first facial gesture and the first non-speech utterance based upon a mapping of the user, and wherein the mapping of the user is generated via a machine learning process that learns that the first facial gesture in combination with the first non-speech utterance signifies the intention to change the state of the network-connected device;

generating the audio command to cause the state of the network-connected device to change in accordance with the intention, after the first processor confirms the intention to change the state of the network-connected device based on a response of the user that includes a second facial gesture and a second non-speech utterance; and providing, via the cellular access network, the audio command to the first processor along with an instruction to cause the first processor to play the audio command via the speaker of the first processor in the vicinity of the interactive voice assistant device located in the home network.

13. A method comprising:

capturing, by a first processing system located in a home network, images of a face of a user, wherein the first processing system includes at least one processor and is remote from a telecommunication network that is connected to the home network via a cellular access network;

sending, by the first processing system located in a home network, the images of the face of the user to a second processing system;

obtaining the images of the face of the user in the home network, by the second processing system located in the telecommunication network, wherein the second processing system includes at least one processor;

detecting, by the second processing system, a first facial gesture of the user from the images;

capturing, by the first processing system, a first non-speech utterance of the user;

sending, by the first processing system, the first non-speech utterance of the user to the second processing system;

obtaining, by the second processing system via the cellular access network, the first non-speech utterance of the user;

determining, by the second processing system, an intention to change a state of a network-connected device in the home network, and wherein the intention is determined from the first facial gesture and the first non-speech utterance based upon a mapping of the user, and wherein the mapping of the user is generated via a machine learning process that learns that the first facial gesture in combination with the first non-speech utterance signifies the intention to change the state of the network-connected device;

generating, by the second processing system, an audio command to cause the state of the network-connected device to change in accordance with the intention, after the first processing system confirms the intention to change the state of the network-connected device based on a response of the user that includes a second facial gesture and a second non-speech utterance; and providing, by the second processing system via the cellular access network, the audio command to the first processing system along with an instruction to cause the first processing system to play the audio command via a speaker of the first processing system in a vicinity of an interactive voice assistant device located in the home network, and wherein the first processing system, the second processing system, the interactive voice assistant device, and the network-connected device are distinct devices;

receiving, by the first processing system, the audio command from the second processing system; and playing, by the first processing system, the audio command via the speaker of the first processing system in the vicinity of the interactive voice assistant device to change the state of the network-connected device by the interactive voice assistant device.

14. The system of claim 1, wherein the second operations further comprise:

activating the network-connected device by detecting a third facial gesture prior to performing the obtaining the images, the detecting the first facial gesture, the obtaining the first non-speech utterance, the determining the intention, the generating the audio command, and the providing the audio command.

15. The system of claim 1, wherein the mapping is stored in a database that is accessible by the second processing system.

16. The system of claim 1, wherein the network-connected device is owned by someone other than the user.

17. The system of claim 16, wherein the someone other than the user subscribes to a network-based service provided by the second processing system.

18. The system of claim 9, where the presence of the user is detected via a radio frequency identification tag of the user.

19. The system of claim 14, wherein the third facial gesture is mapped in the mapping to a wake up word that activates the network-connected device.

20. The method of claim 13, wherein the first processing system comprises a wearable device.

* * * * *